Oct. 3, 1939.  T. FRIEDMAN  2,174,577
STRAINER
Filed Jan. 11, 1938  2 Sheets-Sheet 1

INVENTOR.
THEODORE FRIEDMAN
BY
ATTORNEY.

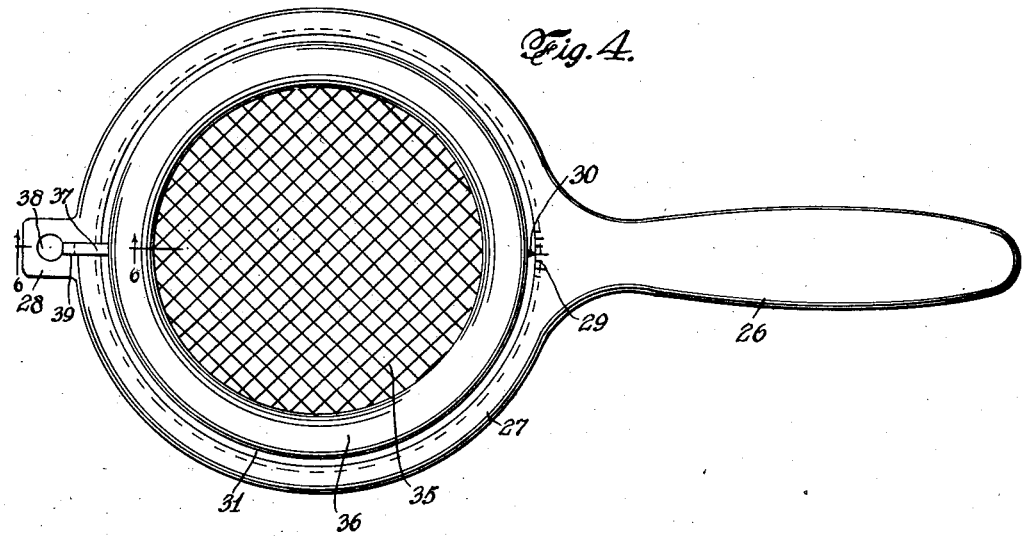
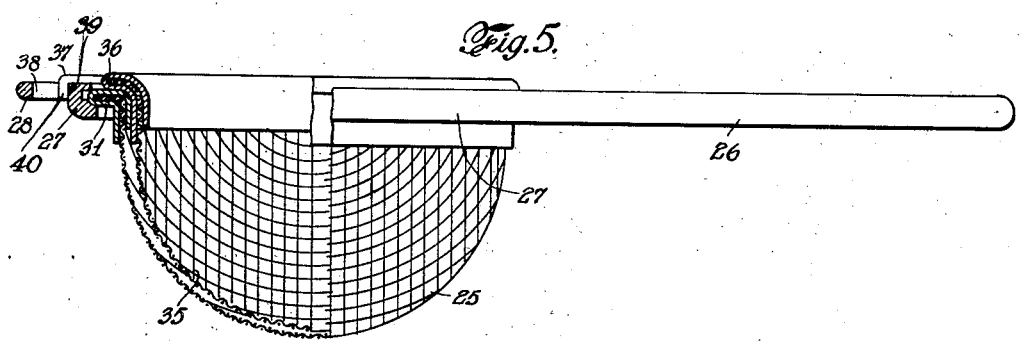
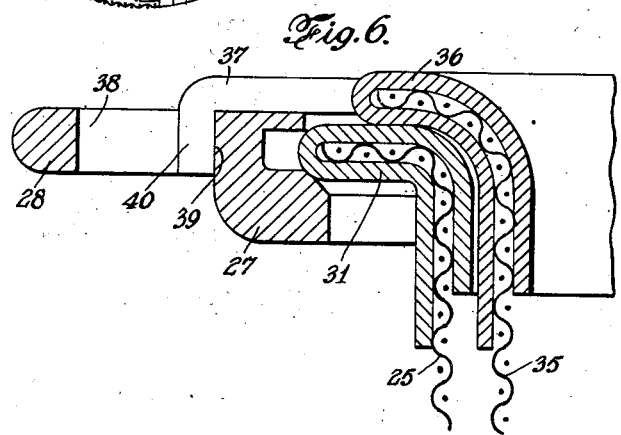

Patented Oct. 3, 1939

2,174,577

UNITED STATES PATENT OFFICE 2,174,577

STRAINER

Theodore Friedman, New York, N. Y.

Application January 11, 1938, Serial No. 184,366

7 Claims. (Cl. 210—161)

The invention relates to strainer devices such as are used for domestic or household purposes, and more especially to a strainer member with replaceable strainer element.

It has for an object a utensil of this nature of sturdy, durable and economical construction and in which the strainer element may be readily separated from its supporting or suspending means as for facilitating cleaning thereof and in the substitution of an element of one mesh screen for another.

A further object of the invention resides in the provision of a rigid frame as the supporting or suspending means for the strainer element.

Another object of the invention is to so construct the supporting or suspending means in relation to the strainer element that the latter will be retained securely in position in the former yet be readily replaceable when desired.

A still further object of the invention is to provide a construction whereby a plurality of strainer elements or units may be combined on a rigid supporting or suspending frame common thereto and in a manner such as to admit of adjustment of one unit with respect to another, whereby a plurality of mesh screen combinations may be secured with a minimum number of units; also, to provide for indicator means whereby the movable unit may readily be set to secure predetermined mesh combinations.

In carrying out the invention, a supporting or suspending member is provided in the nature of a rigid frame having at one end a ring with vessel-rest, and having also a handle extending from the ring for manipulating the member. The ring along its inner edge bears diametrically disposed notches which may be provided in an upper overhanging portion of a circular channel formed in the ring and opening inwardly and whose lower wall affords a circular ledge. Upon this ledge a flange of a strainer element may ride after passing projections from its circumference through the said notches to fit the channel and thereby secure temporarily the strainer element on the frame in its position for use.

The foregoing arrangement for positioning a strainer element lends itself also for combining two such elements to secure different mesh combinations, the second element then being nested in the other which is angularly adjustable in the rigid frame relatively thereto to secure a desired mesh different from either.

The nature of the invention, however, will best be understood when described in connection with the accompanying drawings, in which:

Fig. 4 is a plan view of a modified form of the strainer device and embodying a plurality of strainer elements.

Fig. 5 is a part longitudinal section and part front elevation of the strainer device shown in Fig. 4.

Fig. 6 is a fragmentary detail section illustrating the manner of nesting a plurality of strainer elements, and taken on the line 6—6, Fig. 4 of the drawings.

Figure 1:
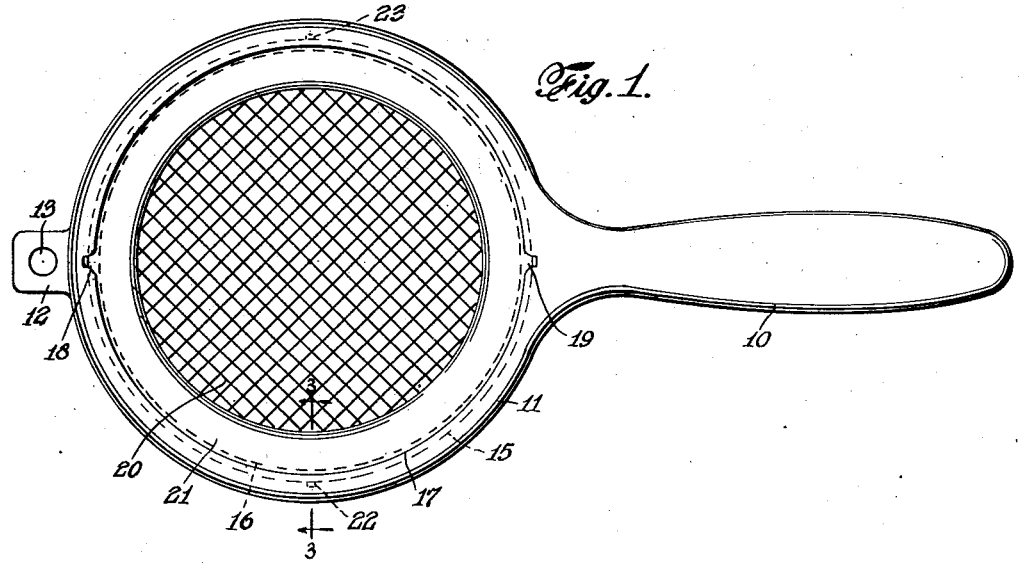
Fig. 1 is a plan view of the novel strainer device with strainer element positioned for use.
Figure 2:
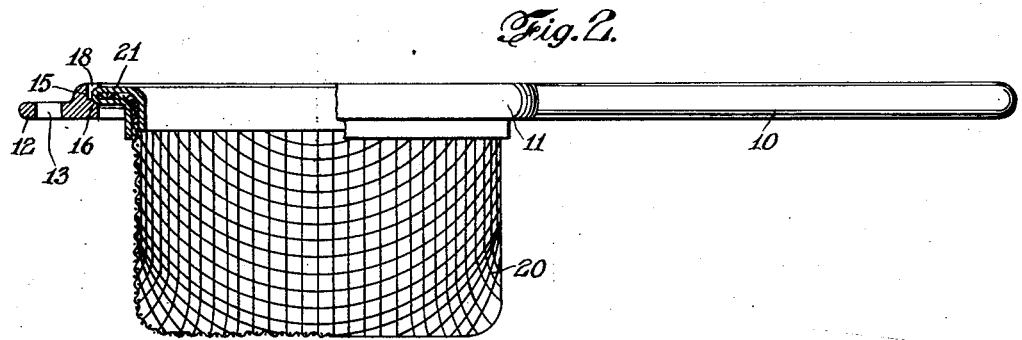
Fig. 2 is a part longitudinal section and part front elevation thereof.
Figure 3:
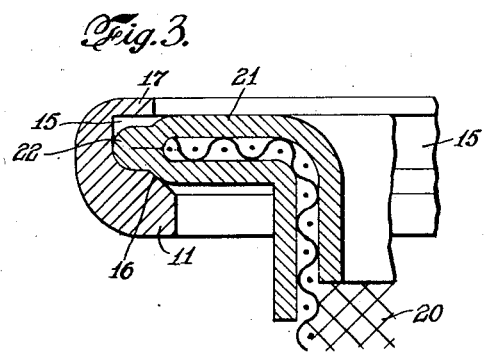
Fig. 3 is a fragmentary enlarged sectional view taken on the line 3—3, Fig. 1.

Referring to the drawings, more particularly Figs. 1-3, the novel strainer member is indicated as comprising a rigid frame having the handle 10 and a ring portion 11 integral therewith, together with a vessel-rest 12 extending radially from the ring at the side opposite the handle portion and perforated at 13. The ring 11 is constructed to provide a circular channel 15 opening inwardly and formed by ledge portion 16 and a portion 17 overhanging the ledge. This latter portion is preferably of greater diameter of opening than the ledge and is diametrically notched as at 18 and 19.

The aforesaid notches are provided for the purpose of enabling a strainer element to be removably carried by the frame, said element comprising the usual basket 20, and a circular flanged rim 21 for holding the foraminous basket material. Extending radially outwardly from said rim are diametrically disposed projections 22 and 23 spaced to register with the said notches 18 and 19. The said projections may thus be passed through the corresponding notches to position the rim on the frame; and, by turning the strainer element angularly, the projections are located beneath the overhanging portion 17 to cause the same to fit snugly in the channel and thereby hold the strainer element firmly in its frame for use. When it is desired to remove the strainer element, it is necessary merely to turn the same accordingly to again register the projections with the notches and then separate the strainer element bodily from the frame.

The overhanging portion 17 affording an opening of greater diameter than the ledge, the flange 21 may be of a diameter such as to cause its circumferential portion to extend inwardly sufficiently to rest upon the ledge 16 and to ride thereover as the strainer element is angularly adjusted into position for use or for withdrawal from the same, and thus further insuring substantial support of the element.

The aforesaid mounting lends itself also to the positioning of a plurality of strainer elements upon a rigid frame common thereto in a manner such as to secure different mesh combinations. For example, as indicated in Figs. 4–6 of the drawings, a strainer element 25 is mounted in a rigid frame, comprising the handle portion 26, ring 27, and vessel-rest 28, similarly to the arrangement disclosed in the embodiment shown in Figs. 1–3, whereby the said strainer element may be angularly positioned in the frame. In the present instance, there may be provided on the surface of the ring portion 27 a scale or suitable indicia 29 for cooperation with a marker or a suitable indicator 30 on the flange 31 of said strainer element, whereby predetermined locations of the latter with respect to the former may be effected for the purpose hereinafter set forth.

In accordance with the invention, the second strainer element 35 having the flanged rim 36 is designed so as to fit within the strainer element 25 with the bottom of its basket portion in close proximity to the bottom of the basket portion of said element so that the respective meshes of the baskets may cooperate to secure different combinations of meshes as the one basket is rotated relatively to the other. To this end, provision is made to fix the position of the latter strainer element 35 with respect to the frame, for example, by providing a finger 37 which extends radially outwardly from the rim 36 toward the vessel-rest 28. The perforation 38 therein may be extended as a rectangular opening 39 to receive the correspondingly shaped and turned-down end 40 of the finger 37. By this expedient, strainer element 35 will be held against angular movement with respect to the ring 27 and its flanged rim 36 may rest upon the flanged rim 31 of the angularly movable strainer element 25.

It is preferred to make the turned-down portion 40 more or less resilient to secure a substantial hold in the opening 39 and thereby insure the fixed position of the strainer element 35 when in use, while permitting of its ready removal when desired.

It will be observed, therefore, that after the strainer element 35 has been positioned as hereinbefore set forth and nested within the strainer element 25 on the rigid frame common to both elements, angular positioning of the latter element in the channel of said frame will provide for various mesh combinations of the juxtaposed bottom portions of the two strainer elements. While the mesh of the two said elements may be different one from the other, it is preferred generally to make the same of the same mesh; and by providing the indicia 29 and 30 respectively on the frame and the rim of the movable strainer element 25 for juxtaposition, said strainer element may be set to predetermined known combinations affording the desired meshes.

I claim:

1. Strainer member with replaceable strainer element, comprising a rigid frame in the nature of a ring at one end and a handle extending therefrom for manipulating the member, the ring portion affording an inwardly directed channel over its inner edge bearing notches extending from the upper face of the ring to the channel, and a strainer element with circular rim having projections extending from its circumference spaced to fit said notches to position the element for angular adjustment in the said channel.

2. Strainer member with replaceable strainer element, comprising a rigid frame in the nature of a ring at one end and a handle extending therefrom for manipulating the member, the ring portion along its inner edge being provided with a circular ledge and with a circular portion overhanging said ledge to form therewith a circular channel opening inwardly and the overhanging portion being diametrically notched, and a strainer element with circular rim having projections extending diametrically from its circumference adapted to pass through said notches, said projections fitting the channel and being adapted to ride over the ledge to secure temporarily the strainer element in position for use.

3. Strainer member with replaceable strainer element, comprising a rigid frame in the nature of a ring at one end and a handle extending therefrom for manipulating the member, the ring portion affording an inwardly directed channel over its inner edge bearing notches extending from the upper face of the ring to the channel, a strainer element with circular rim having projections extending from its circumference spaced to fit said notches to position the element for angular adjustment in the said channel, and a second strainer element nested within the first-named strainer element and removably held to the said frame.

4. Strainer member with replaceable strainer element, comprising a rigid frame in the nature of a ring at one end with an opening in the frame and handle extending from the ring for manipulating the member, the ring portion affording an inwardly directed channel over its edge bearing notches extending from the upper face of the ring to the channel, a strainer element with circular rim having projections extending from its circumference spaced to fit said notches to position the element for angular adjustment in said channel, and a second strainer element nested within the first-named strainer having means extending outwardly over the latter adapted to fit the opening in the frame.

5. Strainer member with replaceable strainer element, comprising a rigid frame in the nature of a ring at one end with an opening in the frame and handle extending from the ring for manipulating the member, the ring portion affording an inwardly directed channel over its edge bearing notches extending from the upper face of the ring to the channel, a strainer element with circular rim having projections extending from its circumference spaced to fit said notches to position the element for angular adjustment in said channel, and a second strainer element nested within the first-named strainer having a flange adapted to rest thereon and a finger extending radially outwardly therefrom over the said first-named strainer and turned downwardly to engage the opening in the frame.

6. Strainer member with replaceable strainer element, comprising a rigid frame in the nature of a ring at one end with a rectangular opening in the frame and handle extending from the ring for manipulating the member, the ring portion affording an inwardly directed channel over its edge bearing notches extending from the upper face of the ring to the channel, a strainer element with circular rim having projections extending from its circumference spaced to fit said notches to position the element for angular adjustment in said channel, and a second strainer element nested within the first-named strainer having a resilient finger of rectangular shape extending outwardly over the latter adapted to fit the opening in the frame to retain said second strainer element against angular movement relatively to the first-named strainer element.

7. Strainer member with replaceable strainer element, comprising a rigid frame in the nature of a ring at one end with an opening in the frame and handle extending from the ring for manipulating the member, the ring portion affording an inwardly directed channel over its edge bearing notches extending from the upper face of the ring to the channel, a strainer element with circular rim having projections extending from its circumference spaced to fit said notches to position the element for angular adjustment in said channel, the top surface of the rim of said strainer element and the juxtaposed surface of the frame bearing cooperating indicia whereby the degree of angular adjustment of the strainer element in the channel may be determined, and a second strainer element nested within the first-named strainer element and removably held to the said frame.

THEODORE FRIEDMAN.